United States Patent Office 3,196,138
Patented July 20, 1965

3,196,138
THREE-COMPONENT CATALYST FOR OLEFIN POLYMERIZATION CONTAINING ALKALI METAL SULFIDE, TITANIUM HALIDE AND TETRAKIS (DIHYDROCARBONAMINO) SILANE
Chris E. Best, Akron, Ohio, assignor to The Firestone Tire & Rubber Company, Akron, Ohio, a corporation of Ohio
No Drawing. Filed Sept. 5, 1961, Ser. No. 135,768
6 Claims. (Cl. 260—93.7)

This invention relates to the polymerization of ethylenically unsaturated compounds, and to novel catalysts for use in such polymerization.

Briefly, the invention consists in contacting the ethylenically unsaturated compounds to be polymerized with a catalyst comprising (A) a sulfide of a metal belonging to group I-A, II-A, II-B, III-A or IV-A of the Periodic Table[1] plus (B) a compound such as a salt or an oxide of a heavy metal or of boron, silicon, arsenic or tellurium, plus (preferably) (C) a hydrocarbonaminated silicon or titanium compound in which hydrocarbonamino groups are attached to atoms of silicon or titanium by means of a silicon- or titanium-nitrogen bond. The resultant products are high polymeric substances useful as resins, elastomers and the like. Particularly when the monomers employed are olefins, and still more particularly when they are alpha-olefins such as propylene, the products comprise largely the desirable crystalline isotactic polymers of these monomers.

THE METAL SULFIDES USED

These may be sulfides of any of the metals of groups I-A, II-A, II-B, III-A or IV-A of the Periodic Table, for instance (the preferred) sodium sulfide ($Na_2S$), lithium sulfide ($Li_2S$), potassium sulfide ($K_2S$), magnesium sulfide ($MgS$), calcium sulfide ($CaS$), barium sulfide ($BaS$), aluminum sulfide ($Al_2S_3$) and the like. These compounds may be prepared by any usual procedures, but best results have been obtained using compounds which have been prepared by direct reaction of elemental sulfur with the appropriate metal. For instance, molten sodium may be dispersed and agitated in a hydrocarbon oil or other vehicle, at temperatures in the range of 0°–400° C., and sulfur added gradually (the order of addition may of course be reversed, or both reactants added simultaneously; however, in the interest of safety and control of the reaction, the entirety of the reactants should not be charged simultaneously). The reaction is exothermic, and cooling may be applied if necessary. Sulfides so prepared appear to have particularly desirable activity in the catalysts of this invention; it is surmised that this results from the physical form of the product, strained and defect areas in the crystal of the particles thereof, and conceivably to traces of extremely finely divided unreacted metal which might have some synergistic action in the catalysts.

[1] The version of the Periodic Table referred to is that given in Lange's "Handbook of Chemistry," fifth edition, Handbook Publishers, Inc., 1944, pages 54 and 55; and by the term "heavy metals" it is intended to designate all of the elements embraced by the heavy black lines within the bracket entitled "Heavy Metals," including the lanthanides or rare earth elements Nos. 57–71.

(B) THE HEAVY METAL COMPOUNDS

The heavy metal compounds forming the component (B) of the catalysts of this invention are those of the heavy metals, (i.e., those metals embraced by the heavy black lines within the brackets entitled "Heavy Metals" including the lanthanides or rare earth elements Nos. 57–71 in the Periodic Table on pages 54 and 55 of Lange's "Handbook of Chemistry," fifth edition, Handbook Publishers, Inc., 1944, or of boron, silicon, arsenic or tellurium. In general the compounds used will be oxides of these metals or salts thereof such as the chlorides, bromides, iodides, acetyl-acetonates, alkoxides or the like, it being understood that the salts need not be simple salts but may be the oxy-salts or salts containing different anions. Specific suitable heavy metal compounds for use in this invention include for instance titanium tetrachloride, zirconium tetrachloride, zirconium acetyl-acetonate, titanium tetrabutoxide, vanadium oxytrichloride, ferric chloride, ferrous chloride, titanium trichloride, antimony pentachloride, bismuth trichloride, titanium dichloride, stannic chloride, cobaltous chloride, antimonyl chloride, tungsten pentachloride, chromium chloride, nickel chloride and the like. Particularly satisfactory results are secured with certain "activated" aluminum-titanium-chlorine-containing preparations produced by heating metallic aluminum with titanium tetrachloride at moderately elevated temperatures on the order of 90° C. in approximately the mol ratio of 3 mols of titanium tetrachloride to 1 gram-atom of aluminum metal. The reaction product has the empirical formula $Ti_3AlCl_{12}$, and appears to be a true compound of all of these elements, since any excess of titanium tetrachloride may be leached therefrom down to, but not beyond, the composition of the formula given. The simple reaction product prepared as just described should preferably be subjected to an "activation" process, after which it is known as an "activated" preparation and is suitable for use in this invention. The intermediate simple reaction product is subjected to intensive grinding as in a ball mill, edge runner, roll mill, disc mill, impact mill or the like. In general the extent of the grinding should be such that the power consumed in the process will amount to about 3–100 kilowatt hour per gram of material. The function of this grinding is not alone to reduce the particle size, but seems also to develop certain hyperactive, strained, crystal defect areas in the material, as the crystalline X-ray diffraction pattern changes progressively during the grinding. It will be understood that mixtures of heavy metal compounds above indicated as suitable may also be employed.

(C) THE HYDROCARBONAMINATED SILICON AND TITANIUM COMPOUNDS

These may be any compounds wherein one or more alkylamino groups are attached to a silicon or titanium atom by means of a covalent bond from the alkylamino nitrogen atom to the silicon or titanium atom, thus

where

R, independently in each occurrence represents a hydrocarbon group containing 1–20 carbon atoms, and Z is a silicon or titanium atom, the free valences of which may be occupied by other hydrocarbonamino groups or other innocuous groups such as oxo groups, oxygen bridges to other silicon atoms, alkyl groups and the like.

One class of such compounds are the tetrakis(dihydrocarbonamino) silanes and titaniums of the formula (V) 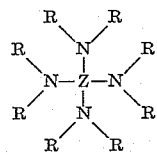

under the above notation. Likewise suitable are the compounds in which the silicon and titanium atoms are linked into chains with oxygen groups as in the siloxanes and corresponding titanium compounds:

(VI) 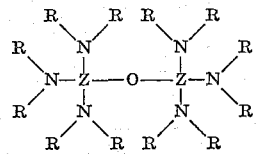

The atom Z may also have one or more halogen atoms thereon as in compounds of the type $[(R_2N)]_3SiCl$ or $[(R_2N)_2SiCl]$—O—$[Si(R_2N)_3]$. The central silicon or titanium compounds may also be connected to an oxo group thus

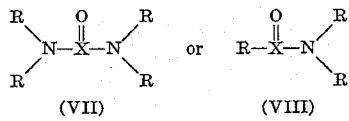

(VII)          (VIII)

Compounds of the above various types are exemplified in tetrakis - (dimethylamino) silane, tetrakis-(dimethylamino) silane, tetrakis-(di-n-butylamino) silane, tetrakis-(di - n - dodecylamino) silane, tetrakis-(di-n-octadecylamino (silane, tetrakis-(diphenylamino) silane, tetrakis-(dimethylamino) titanium, tetrakis-(dimethylamino) titanium, hexakis-(dimethylamino) siloxane, the corresponding titanium compound

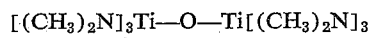

hexakis - (di-ethylamino) siloxane, hexakis-(di-dodecylamino) siloxane, tri-(dimethylamino) ethyl silane, tri-(dimethylamino) ethyl titanium, alkylamino silicone polymers, the compound of the formula

and the like.

THE MONOMERIC ETHYLENICALLY UNSATURATED COMPOUNDS

The polymerization method of the invention is applicable to the polymerization of any of the ethylenically unsaturated monomers commonly polymerized, and it is especially applicable to the polymerization of alpha-olefins, which are generally less readily polymerizable than the more polar ethylenically unsaturated monomers. The polymerization of propylene by the method of the invention is especially advantageous, since the polymerization products under preferred conditions possess a high degree of crystallinity. Other mono-olefins suitable for polymerization by the method of the invention include, for example, ethylene, butene-1, isobutylene, pentene-1, hexane-1, 3-ethylhexene-1, octene-1, 2-methylbutene-1, 3-methylbutene-1, 3,3-dimethylbutene-1, 2-methylpentene-1, 3-methylpentene-1, 4-methylpentene-1, 3-ethylpentene-1-, 4,4-dimethylpentene-1, cyclopentene, cyclohexene, styrene, alpha-methylstyrene, chlorostyrene, divinylbenzene, vinylnaphthalene, and the like. Also amenable to the process of the invention are polyolefinic compounds including, without limitation, butadiene-1,3, isoprene, 2,3-dimethylbutadiene-1,3, piperylene and the like. Likewise the invention can be used to polymerize vinyl and vinylidene monomers including, without limitation vinyl chloride, vinylidene chloride, chlorotrifluoroethylene, the lower alkyl acrylates, the lower alkyl methacrylates, the lower alkyl ethacrylates, vinyl acetate, vinyl propionate, acrylonitrile, methacrylonitrile, vinylpyridines, vinylcarbazole, and the like. The invention can be used to make copolymers or interpolymers of any of the monomers indicated above. Likewise the invention can be utilized to polymerize a prepolymer of partially polymerized compound, with itself or with another ethylenically unsaturated compound.

THE PREPARATION OF THE CATALYSTS AND CONDUCT OF THE POLYMERIZATION REACTION

The catalysts of this invention are prepared by mixing and agitating together (A) the metal sulfide plus (B) the heavy metal compound plus preferably (C) the alkylaminated silicon or titanium compound, preferably in a saturated aliphatic or aromatic hydrocarbon vehicle such as petroleum ether, heptane, kerosene, mineral oil, diesel oil, benzene, toluene or the like. In many cases, one or more of the components will be insoluble in the vehicle, in which case it may be advisable to subject the catalyst mass to grinding, as in a ball mill. Temperature of mixing may vary within wide limits, usually between −10° C. or lower, say down to −100° C. up to temperatures on the order of 150° C. Preferably the temperature will be in the range 20° C. to 100° C. These temperature ranges apply also to the polymerization reaction proper. As to the relative proportions of the ingredients, usually a sufficient amount of the metal sulfide will be use to supply at least .3 mol of the metal sulfide for each gram-atom of heavy metal in the heavy metal compound. The upper limit is not critical, and is set mainly by economic considerations of cost of supplying unnecessary metal sulfide. It will usually be desirable to operate in the range of 1.0 to 3.0 mols of the metal sulfide per gram-atom of heavy metal in the heavy metal compound. As to the amount of the hydrocarbonaminated silicon compounds to be used, very small amounts, say sufficient to provide 0.01 gram-atom of amino nitrogen in the alkylaminated silicon or titanium compound per mol of the metal sulfide will exert some beneficial effect. Usually sufficient hydrocarbonaminated compound will be supplied to furnish 0.4 gram-atom of amino nitrogen per mol of metal sulfide. Again it will be appreciated that the upper limit will be imposed by economic considerations of supplying unneeded compound, rather than any technical considerations. Usually, not more than sufficient of the hydrocarbonaminated compound will be used than sufficient to provide 5 gram-atoms of amino nitrogen per mol of metal sulfide. Other additives designed to enhance the performance of the catalysts and the properties of the polymeric product may be used concurrently with the hydrocarbonaminated silicon and titanium compounds of this invention, for instance hexamethyl phosphoramide. The polymerization is carried out by contacting the monomers with the catalyst, preferably in a saturated liquid hydrocarbon vehicle such as suggested above, preferably with sufficient agitation to insure contact of the catalyst and monomers and to avoid segregation of the product. The amount of vehicle employed should be preferably sufficient to avoid difficulty in agitation during the reaction, i.e. so that the concentration of the final polymer product will not be over about 50%, based on the toal weight of polymer plus vehicle. The amount of catalyst should be such that it will reach economic exhaustion at about the same time that the vehicle contains all of the polymer it can carry without difficulty in agitation. Ordinarily it will be expected that each gram of catalyst will produce from 15 to 100 grams of polymer. The polymerization may be carried out batchwise, or in a continuous manner wherein the catalyst (or ingredients thereof), vehicle and monomer are continuously supplied to a reactor system and the resultant polymer solution or dispersion is continuously discharged from the reactor system. The polymeric products are purified by any suitable treatment, as by washing with alcohols, acids, ammonia and the like.

With the foregoing general discussion in mind, there are given herewith detailed examples of the practice of this invention. All parts and percentages are given on the basis of weight, unless the contrary is specifically indicated.

(A) PREPARATION OF SODIUM SULFIDE

Sodium dispersion _____ 79.5 g. (1.2 g.-atom
  (in petrolum, contains 34.74%    of sodium).
  sodium)
Paraffin oil _____ 502 ml.
  ("Sohitek-70" a mineral oil dis-
  tributed by the Standard Oil
  Company of Ohio)
Sulfur (flowers) _____ 19.2 g. (0.6 g.-atom
                                    of sulfur).

The sodium dispersion and paraffin oil were blended at 80° C. The mixture was then charged to a 1-liter 3-necked flask provided with a stirrer, thermometer, and nitrogen inlet and outlet. The flask was cooled to 30° C. by means of a water bath, and stirring commenced and maintained throughout the rest of the reaction. The sulfur was then added incrementally, the temperature rising to 40° C. during the addition. The cooling bath was then removed, whereupon the temperature rose to 79° C. A heating mantle was applied, and the temperature raised to 120° C., after which the reaction mass was allowed to cool to 25° C. The product, an olive-drab suspension, was then transferred to a nitrogen-flushed beverage bottle which was sealed with a crown cap provided with an elastomer seal and a perforation for the hypodermic withdrawal of the contents. The calculated concentration is 1 molar in $Na_2S$.

*Example I*

Heptane _____ 250 ml.
Propylene _____ 25 g.
Aluminum-titanium-chloride prepara-
  tion suspension_____ 1 ml. (.002 mol).
  (Produced by reduction of $TiCl_4$
  with metallic aluminum, followed
  by intensive grinding; "AA"
  produced by Stauffer Chemical
  Company—2 molar suspension,
  in mineral oil)
Tetrakis-(dimethylamino) silane solu-
  tion _____ 1 ml. (.001 mol).
  (1 molar, in Shell Oil Company
  commercial heptane)
Sodium sulfide suspension_____ 2.0 or 3.0 ml.
  (Prepared as just described)    (.002 or .003
                                   mol of $Na_2S$).

Two runs were made in accordance with the above recipe, one using .002 and the other .003 mol of sodium sulfide. In each run the heptane was charged into a 28-ounce beverage bottle, which was then flushed with nitrogen and sealed with a neoprene-lined crown cap provided with a perforation for hypodermic injection of reactants. The bottle was then inverted and placed upon a cradle on a balance which was first brought to equilibrium and then over-weighted with a 25-gram weight. Propylene was injected through a conduit and hypodermic needle until the balance was again in equilibrium. The back-pressure at this point was about 30 p.s.i.g. The remaining ingredients were then hypodermically injected in the order named, and the bottle placed on a polymerizer wheel which dipped and revolved the bottle in a water bath at 50° C. for 41 hours, the pressure being taken at 17 and 41 hours by means of a hypodermic gauge (bottle at bath temperature). At the end of this time the bottle was removed from the wheel, cooled to 25° C., vented, opened and the contents poured into an equal volume of methanol and stirred for 5 minutes. The slurry was filtered and the cake re-slurried and agitated for 5 minutes with a mixture of 250 ml. of methanol and 10 ml. of a 2.5% acetone solution of dilauryl thiodipropionate. The slurry was again filtered, and the cake air dried to yield a product which was largely a crystalline, isotactic polypropylene resin. Its weight is recorded in Table I. The filtrates from the various operations described above were combined and evaporated, leaving as a residue a rubbery product which was largely an atactic non-crystalline polypropylene. Likewise physical properties were determined on samples molded from the crystalline resinous product. Set forth herewith in Table I are the particulars of the several runs.

TABLE I

| Mols of $Na_2S$ used | Pressure (p.s.i.g.) at the end of— | | Yield of Product (grams) | | Physical Properties | |
|---|---|---|---|---|---|---|
| | 17 hrs. | 41 hrs. | Crystal-line | Rubbery | Bending Modulus (p.s.i.) | Rockwell Hardness (R-scale) |
| .002 | 49 | 34 | 16.0 | 2.1 | 98,000 | 70 |
| .003 | 39 | 25 | 18.3 | 1.5 | 87,200 | 64 |

*Example II*

Heptane _____ 250 ml.
Propylene _____ 25 g.
Aluminum-titanium-chlorine prepa-
  ration suspension_____ 1 ml. (.002 mol).
  (Produced by reduction of
  $TiCl_4$ with metallic aluminum
  followed by intensive grind-
  ing. "AA" produced by the
  Stauffer Chemical Com-
  pany—2 molar, suspended in
  mineral oil)
Tetrakis-(dimethylamino) silane so- 1.0–2.0 ml. (.001–
  lution _____  .002 mol, per Ta-
  (1 molar, in Shell Oil Com-      ble II).
  pany commercial heptane)
Sodium sulfide suspension_____ 2.5–3.5 ml. (.0025–
  (1 molar, prepared as described  .0035 mol $Na_2S$).
  at "A" above)

A series of runs was made in accordance with the foregoing recipe, varying the tertakis-(dimethylamino) silane and sodium sulfide from run to run as set forth in Table II. In each run, the polymerization and polymer recovery procedure of Example I was employed, except that the polymerization was run for 72 hours, with pressure readings being taken at 24, 48 and 72 hours. The crystalline resin products were noteworthy for their whiteness. Set forth here in Table II are the particulars of the several runs.

TABLE II

| Catalyst Components (millimols) | | Pressure (p.s.i.g.) at— | | | Run No. |
|---|---|---|---|---|---|
| $Na_2S$ | TDSI [1] | 24 hrs. | 48 hrs. | 72 hrs. | |
| 2.5 | 1.0 | 46 | 31 | 29 | 1 |
|  | 1.5 | 50 | 32 | 30 | 2 |
|  | 2.0 | 48 | 32 | 30 | 3 |
| 3.0 | 1.0 | 43 | 30 | 29 | 4 |
|  | 1.5 | 42 | 25 | 23 | 5 |
|  | 2.0 | 44 | 29 | 27 | 6 |
| 3.5 | 1.0 | 42 | 28 | 26 | 7 |
|  | 1.5 | 41 | 24 | 22 | 8 |
|  | 2.0 | 44 | 22 | 19 | 9 |

[1] Tetrakis-(dimethylamino) silane.

The yields in the several runs were as follows:

TABLE III

| Run No. | Yield of Product (grams) | |
|---|---|---|
| | Crystalline | Rubbery |
| 1 | 14.9 | 1.9 |
| 2 | 14.9 | |
| 3 | 15.1 | 2.4 |
| 4 | 15.7 | 2.4 |
| 5 | 18.2 | 2.3 |
| 6 | 16.0 | |
| 7 | 17.4 | 3.1 |
| 8 | 19.2 | 2.9 |
| 9 | 20.3 | 1.5 |

What is claimed is:

1. Process which comprises polymerizing an ethylenically unsaturated compound by contacting the same with a catalyst comprising (A) an alkali metal sulfide plus (B) a titanium halide plus (C) a tetrakis(dihydrocarbonamino) silane in which the hydrocarbon groups in the hydrocarbonamino radicals contain 1–20 carbon atoms, the ratio of the number of mols of the constituent (A) to the number of gram-atoms of titanium in constituent (B) being at least .3 and the ratio of the number of mols of amino nitrogen in constituent (C) to the number of mols of constituent (A) being at least .01.

2. Process which comprises polymerizing propylene by contacting the same with a catalyst comprising (A) an alkali metal sulfide plus (B) a titanium halide plus (C) a tetrakis(dihydrocarbonamino) silane in which the hydrocarbon groups in the hydrocarbonamino radicals contain 1–20 carbon atoms, the ratio of the number of mols of the constituent (A) to the number of gram-atoms of titanium in constituent (B) being from 1.0 to 3.0 and the ratio of the number of mols of amino nitrogen in constituent (C) to the number of mols of constituent (A) being 0.4 to 5.0.

3. Process of polymerizing an ethylenically unsaturated compound which comprises contacting the same with a catalyst comprising (A) sodium sulfide plus (B) a reaction product having the empirical formula $Ti_3AlCl_{12}$ produced by the reduction of titanium tetrachloride by means of metallic aluminum followed by activation by mechanical grinding plus (C) terakis-(dimethylamino) silane, the ratio of the number of mols of the constituent (A) to the number of gram-atoms of titanium in constituent (B) being from 1.0 to 3.0 and the ratio of the number of mols of amino nitrogen in constituent (C) to the number of mols of constituent (A) being 0.4 to 5.0.

4. Process of polymerizing propylene which comprises contacting the same with a catalyst comprising (A) sodium sulfide plus (B) a reaction product having the empirical formula $Ti_3AlCl_{12}$ produced by the reduction of titanium tetrachloride by means of metallic aluminum followed by activation by mechanical grinding plus (C) tetrakis-(dimethylamino) silane, the ratio of the number of mols of the constituent (A) to the number of gram-atoms of titanium in constituent (B) being from 1.0 to 3.0 and the ratio of the number of mols of amino nitrogen in constituent (C) to the number of mols of constituent (A) being 0.4 to 5.0.

5. Catalytic composition comprising (A) an alkali metal sulfide plus (B) a titanium halide plus (C) a compound having at least one hydrocarbonamino group attached via a bond from the amino nitrogen atom to silicon, the ratio of the number of mols of the constituent (A) to the number of gram-atoms of titanium in constituent (B) being from 1.0 to 3.0 and the ratio of the number of mols of amino nitrogen in constituent (C) to the number of mols of constituent (A) being 0.4 to 5.0.

6. A catalytic composition comprising (A) sodium sulfite plus (B) a reaction product having the empirical formula $Ti_3AlCl_{12}$ produced by the reduction of titanium tetrachloride by means of metallic aluminum followed by activation by mechanical grinding plus (C) tetrakis-(dimethylamino) silane, the ratio of the number of mols of the constituent (A) to the number of gram-atoms of titanium in constituent (B) being from 1.0 to 3.0 and the ratio of the number of mols of amino nitrogen in constituent (C) to the number of mols of constituent (A) being 0.4 to 5.0.

References Cited by the Examiner

UNITED STATES PATENTS 2,922,782   1/60   Hay _____ 260—94.9

JOSEPH L. SCHOFER, *Primary Examiner.*